UNITED STATES PATENT OFFICE.

WILLIAM J. TAYLOR, OF HIGH BRIDGE, NEW JERSEY.

IMPROVEMENT IN THE MANUFACTURE OF IRON.

Specification forming part of Letters Patent No. 145,462, dated December 9, 1873; application filed December 5, 1873.

CASE B.

*To all whom it may concern:*

Be it known that I, WILLIAM J. TAYLOR, of High Bridge, in the county of Hunterdon and State of New Jersey, have invented certain new and useful Improvements in the Manufacture of Iron, of which the following is a specification:

The invention under this patent relates to the production of cast-iron, commercially known as pig-iron, by the blast or cupola furnace; and my said invention consists, especially, in the production of a composite material preparatory for use, such material being composed of the extracted magnetic oxides of iron, from the impurities of the native ore, with lime and carbon, mixed in proper proportions with water, so as to form these three constituents into a mortar, the lime being the consolidating element, and produce thereby, when dried, a new article of commerce, in lumps suitable for use in the furnace; the said new composite material combining the comparatively pure oxides of iron, the fluxing material, and the fuel to furnish the required combustion for their reduction to metallic iron, the essential objects being to obtain in each separate and distinct lump of the composite material the elements for uniting, fluxing, and melting; and in this way I am enabled to greatly facilitate the production of the iron, and to very materially reduce the expense in its manufacture, by using fine or powdered refuse fuel, such as fine waste anthracite coal, made by the coal-breakers in the preparation of merchantable coal, or charcoal-dust may be used.

In a patent bearing even date herewith, I have described my new process of consolidating the fine purified oxides of iron with lime for a flux and uniting element, and the controlling thereby the products thereof by the preparation of the material prior to its reduction to metallic iron; and it is deemed only necessary in this patent to state that the oxides of iron are obtained substantially in the manner described in said patent.

The present invention embodies, in combination with the fine purified oxides of iron, fine carbon mixed and united with said oxides and lime, as a consolidating element and fluxing material to obtain a composite material, such as herein stated, as a new article of commerce and trade in the manufacture of iron. The proportions for the production of this new article in lumps are, to each one hundred pounds of oxide of iron, sixty to seventy pounds of fine coal and five to ten pounds of lime; but these proportions may be varied, as practical experience may determine, to insure the best and most economical results. The mixture is made in the same manner as mortar, the lime being the uniting element, and dried in lumps of the most suitable size for reduction to metallic iron in the furnace. The drying of the lumps may be made by exposure to the air, or facilitated by the application of artificial heat.

It is the design that the composite material shall contain a sufficient quantity of fluxing material and carbon to properly effect the reduction of the material; but additional fluxing material, carbon, and raw oxide may be introduced separately into the furnace from time to time, as may be found necessary for the proper working of the furnace, which must be determined by practice.

The state of the art shows that a composite material in lumps for making different kinds of iron and steel has been used, and that such composite material has consisted of the elements for both the fluxing material and the fuel for the combustion, as well as other ingredients; but in such composite material the essential and distinguishing features of a perfect control of the material prior to its use in the furnace is not contemplated by any or all of the efforts made to obtain a composite material, nor has the feature of pure iron oxides obtained by magnetic influence entered into such previous attempts.

I claim—

1. A composite material for the manufacture of cast-iron, consisting of the combination of fine magnetic purified oxides of iron with carbon and lime for a fluxing material necessary for smelting, substantially as herein described.

2. The composite material herein described, as a new article of commerce and trade, in the manufacture of cast-iron.

WILLIAM J. TAYLOR.

Witnesses:
A. E. H. JOHNSON,
J. W. HAMILTON JOHNSON.